United States Patent [19]

Reid

[11] Patent Number: 4,649,170

[45] Date of Patent: Mar. 10, 1987

[54] ABRASION RESISTANT LATEX UNDERBODY COATING

[75] Inventor: William F. Reid, Willow Wood, Ohio

[73] Assignee: Ashland Oil, Inc., Ashland, Ky.

[21] Appl. No.: 727,140

[22] Filed: Apr. 25, 1985

[51] Int. Cl.$^4$ .......................... C09D 5/08; C09D 3/80; C08K 3/26

[52] U.S. Cl. .................................. 524/247; 106/14.15; 524/556; 524/564

[58] Field of Search ...................... 106/14.15; 524/247, 524/556–564

[56] References Cited

U.S. PATENT DOCUMENTS

| | | | |
|---|---|---|---|
| 3,223,666 | 12/1965 | Bolton | 524/666 |
| 3,379,548 | 4/1968 | Jen | 106/245 |
| 3,446,764 | 5/1969 | Phillips et al. | 523/402 |
| 3,699,065 | 10/1972 | Clark | 106/243 |
| 4,039,495 | 8/1977 | Hunsucker | 106/252 |
| 4,051,089 | 9/1977 | Tobias et al. | 525/517.5 |
| 4,081,411 | 3/1978 | Hunsucker | 106/218 |
| 4,184,991 | 1/1980 | Scheurman | 524/91 |
| 4,238,387 | 12/1980 | Antonelli et al. | 524/560 |
| 4,380,601 | 4/1983 | Welsh et al. | 524/560 |
| 4,444,802 | 4/1984 | Winters et al. | 106/14.15 |
| 4,444,803 | 4/1984 | Winters et al. | 106/14.15 |

FOREIGN PATENT DOCUMENTS

WO83/3423 10/1983 World Int. Prop. O. .......... 524/247

OTHER PUBLICATIONS

"Ucar Vehicle", Union Carbide brochure F-44628C.
"Product Information—Ucar Latex 163", Union Carbide brochure F-45966A.
"Product Information—Ucar Latex 123", Union Carbide brochure F-48607.

*Primary Examiner*—Ronald W. Griffin
*Attorney, Agent, or Firm*—Richard C. Willson, Jr.; Louis C. Gubinsky

[57] ABSTRACT

Water-based acrylic impact resistant underbody coating based on a one hundred percent elastic breathable acrylic coating, including coalescing agent and amine and preferably including corrosion inhibitors; plus defoamers, surfactants, fillers, e.g., calcium carbonate and pigments.

28 Claims, No Drawings

ABRASION RESISTANT LATEX UNDERBODY COATING

BACKGROUND OF THE INVENTION (1) FIeld of the Invention

The present invention relates to organic coating compositions and methods for their use generally classified in Class 106, particularly in Subclasses 14.05, 14.11, 14.21, 14.41, 14.44, 288/R, 288/Q and 302.

(2) Description of the Prior Art

U.S. Pat. No. 3,445,764 to Phillips, U.S. Pat. No. 3,699,065 to Clark, U.S. Pat. No. 4,184,991 to Scheurmann III, U.S. Pat. No. 3,223,666 to Botton, U.S. Pat. No. 3,379,548 to Jen, U.S. Pat. No. 4,039,495 to Hunsucker, U.S. Pat. No. 4,051,089 to Debias and U.S. Pat. No. 4,081,411 to Hunsucker, all relating to base resin formulas and not completed coatings, have been considered in the preparation of this application.

Historically, underbody coatings have been soft waxy or asphalt based coatings. Since these coatings protect the underbody and structure of a motor vehicle, they must be tough and abrasion resistance. They must also be flexible in order to withstand breaking and chipping of the coating caused by vehicle vibration.

SUMMARY (1) General Statement of the Invention

The present invention relates to a water based acrylic impact resistant underbody coatings based on a 100% acrylic latex elastic breathable coating including coalescing agent and amine and preferably including corrosion inhibitors, antifoaming agents, surfactants, fillers, coalescing agents and pigments. The coating is flexible, durable and abrasion resistant.

(2) Utility of the Invention

The invention provides valuable coating formulations, providing excellent corrosion protection and abrasion resistances particularly as an underbody coating for a motor vehicle.

DESCRIPTION OF THE PREFERRED EMBODIMENTS

The composition of the invention will preferably comprise an oil-in-water emulsion of about 0.5 to 10% by weight of amine, about 1 to 5% of a coalescing agent and about 30 to 70% of acrylic latex. More preferably, the compositions will comprise:

(a) about 5 to 20% by weight of water;
(b) about 0.5 to 5% of amine;
(c) about 1 to 5% of coalescing agent;
(d) about 0 to 5% of antifoaming agent;
(e) about 0 to 10% of surfactant;
(f) about 0 to 10% of pigment;
(g) about 0 to 15% of corrosion inhibitor;
(h) about 0 to 35% of filler;
(i) about 0 to 10% of crosslinking agent; and
(j) about 40 to 65% of acrylic latex.

Each of these ingredients will be discussed below.

STARTING MATERIALS

Latex

Preferably the compositions of the present invention will include a 100% acrylic latex composition, but latexes could be substituted. Specific acrylic latex copolymers useful in the invention include UCAR 163, UCAR 123 and UCAR 4358, all made by Union Carbide Corporation of Danbury, Conn., described in their brochure F4596A.

The amount of acrylic latex to be used in the invention is preferably in the range of 40 to 70% by weight and more preferably in the range of 54.0 to 60.8% by weight. The most preferred range is 54.0 to 60.5% by weight.

Filler

The preferred filler according to the present invention is calcium carbonate, a clay type filler.

The amount of calcium carbonate present in the composition of the invention is in the range of 9.4 to 29.7% by weight and a more preferred range is 3.6 to 4.0% by weight. The most preferred amount of the filler to be present in the present application is in the range of 9.0 to 10.1% by weight.

Coalescing Agent

According to the invention, several coalescing agents are included. The preferred coalescing agents are ethylene glycol and butyl cellosolve. The amount of coalescing agent present in the composition is in the range of 2.6 to 4.0% by weight and a more preferred range is 3.6 to 4.0% by weight.

In the preferred form of the present invention, the amount of ethylene glycol present is in the range of 1.5 to 2.0% by weight while the amount of butyl cellosolve is in the range of 1.2 to 2.0% by weight. The more preferred range is 1.8 to 2.0% by weight for each of ethylene glycol and butyl cellosolve.

Pigment

The composition of this invention can be manufactured using several pigments. For the typical black color of an underbody coating, a pigment containing carbon black is used. However, a composition using a white pigment to create a white coating has also been prepared. Typical pigments include Perma Black 45, a 43% by weight carbon black composition prepared by Mono-Chem Corporation of Atlanta, Tex.,. Penn Color Black 31B107 a 40% by weight carbon black composition from Penn Color, Inc. of Doylestown, Pa. and Nalzin II, a zinc hydroxyphosphite anticorrosive white pigment prepared by NL Chemicals of Highstown, N.J. Titanium dioxide can also be used.

The amount of black pigment used in the composition is in the range of 3.1 to 7.4% by weight and the more preferred range is 3.6 to 4.0% by weight.

Corrosion Inhibitors

Strontium chromate is the preferred corrosion inhibitor of the present application. Raybo 60 from Raybo Chemical Company of Huntington, W. Va., containing an alkylamine, is also used in a minor amount. Although usually considered as a corrosion inhibitor, Raybo 60 in the present application also acts as a flow additive.

The amount of corrosion inhibitor present in the composition is in the range of 0.4 to 10.6% by weight and more preferably in the range of 9.4 to 10.6% by weight.

The amount of strontium chromate in the composition is in the range of 0 to 10.1% by weight and more preferably in the range of 9.0 to 10.1% by weight. The amount of Raybo 60 ranges from 0.4 to 0.5% by weight.

Antifoaming Agent

A variety of antifoaming agents can be used in the present application. The most useful antifoaming agents appear to contain silica or a silicone or are used in conjunction with a silica containing composition. Nalco 2321, a silicone/silica blend in a hydrocarbon solvent and Nalco 2315 a silica-organic in a hydrocarbon solvent, both prepared by Nalco Chemical Company of Oak Brooke, Ill., as well as Foamaster VF, a silica type defoamer in a blend of oil and surfactants, manufactured by Diamond Shamrock of Morristown, N.J., used in conjunction with Aerosil TR, a silica composition available from Degussa Corporation of Teterboro, N.J. The amount of antifoaming agent present in the composition of the invention is in the range of 1.1 to 1.9% by weight and more preferably in the range of 1.1 to 1.2% by weight.

In particular, the amount of Nalco 2321 as well as the amount of Nalco 2315 is in the range of 0.5 to 1.2% by weight and more preferably within the range of 0.5 to 0.6% by weight. The amount of Foamaster VF present is no more than 0.01% by weight while the amount of Aerosil TR is no more than 0.5% by weight.

Surfactant

Various surfactants can be used as part of the composition of this invention. Typical surfactants include dibutyl phthalate, Igepal CO-630, a nonylphenoxypoly(ethyleneoxy)ethanol from GAF, Corp. of New York, N.Y., and Tamol 850, a sodium salt of a synthetic poly acid prepared by Rohm and Haas Company.

The amount of surfactant in the present composition is in the range of 0 to 5.7% by weight and more preferably within the range of 0 to 5.5% by weight. The most preferred range is 0 to 0.4% by weight.

Igepal CO-630 and Tamol 850 are present in an amount within a range of 0 to 0.1 and 0 to 0.5 respectively. A more preferred range is 0 to 0.1 and 0 to 0.4% by weight, respectively. The most preferred range is 0.07 to 0.08% for Igepal, 0.3 to 0.4% for Tamol, and 5% for dibutyl phthalate.

Cross-Linking Agent

The preferred cross linking agent used in the composition is XL-20, a carbodiimide made by Union Carbide Corporation. The cross linking agent is present in the amount to 0 to 5.9% by weight and more preferably within a range of 0 to 1.5% by weight. Latexes to be used with this crosslinking agent must have carboxyl functionality.

Water

Deionized water will preferably be employed with the formulations of the present invention in order to prevent reaction of chlorine, calcium, magnesium or other components of tap water from interfering with the formulations or their curing. Distilled water could, of course, be employed but will generally be avoided for economic reasons. The reference composition will generally contain an amount of water within the range of 7.6 to 14.0% by weight and more preferably 8.0 to 13.3% by weight. The preferred amount of water is within the range of 8.1 to 13.3% by weight.

pH

The pH of the finished formulations will preferably be within the range of 8.5 to 9.5. The pH is adjusted by the addition of an amine preferably an alkyl alkoxy amine added in amount within the range of 0.7 to 1.0% by weight and more preferably in an amount within the range of 0.9 to 1.0% by weight. The preferred amine is dimethyl ethanol amine and is added at the beginning of the mixing process rather than at the end to avoid formulating problems, e.g., shocking the latex emulsion.

Apparatus

The apparatus for the present invention will be that conventionally utilized in the preparation of coatings compositions, e.g., kettles and mixing tanks having flow metering or measuring devices and agitating means, e.g., pumps mounted on side arms connecting with the main vessel, internal stirrers, contra-rotating shearing devices and any of the other available devices which are well known to the art.

Mixing Procedure

While the formulations of the present invention may be manufactured continuously if desired, batch techniques will be more usually employed. To the blending kettle, with low speed agitation, the following components are added substantially in the following order: about 40% of the water, dimethyl ethanol amine, about 50% of the coalescing agent, about 50% of the antifoaming agent, the surfactant, excluding dibutyl phthalate, the second half of the coalescing agent, and the dibutyl phthalate. About 60% by weight of the acrylic latex is added to the blending kettle very slowly with agitation. The resulting solution swells and thickens. The corrosion inhibitor and the filler are slowly added to allow the dry solids to become wet. When the mixture is smooth, the pigment is added and mixed at high speed. The grinding is continued to a temperature of 49°–50° C. and to a 6 to 7 grind.

The remaining 40% by weight of the acrylic latex is combined with the remaining 50% of the antifoaming agent. A small amount of the corrosion inhibitors is combined with the remaining 60% of the water.

The mixing speed is reduced to low, and the remaining latex mixture and the remaining water mixture are alternately added to the kettle in a ratio to maintain an even viscosity. Blending continues until a uniform mixture is obtained. The pH is checked and adjusted to a range of between 8.5 to 9.5 with additional dimethyl ethanol amine if necessary.

The viscosity is adjusted to Brookfield #5 spindle at 20 RPM of 4500–5500 cps.

This mixture has a flashpoint of approximately 100° F. minimum.

Techniques in mixing described in U.S. Pat. No. 4,479,981 are generally applicable to the invention.

Quality Control

The finished formulation, prior to packaging, will generally be checked for pH, solids content, freeze thaw stability, corrosion-protection under accelerated conditions, and other tests utilizing techniques well known to the coatings industries. Specific tests referred to in this application include:

(1) Gravelometer SAE J 400, wherein coated panels are subjected to a spray of pressurized gravel at −10° F.;

(2) Salt Fog ASTM B 217, wherein coated panels are subjected to a 98% relative humidity, 5% salt solution in atomized air at 95° F. for a varying period of time;

(3) Ci65 Xenon Arc weatherometer, ASTM G26-77;
(4) QUV test of the Atlas Electronic Devices Company, wherein coated panels are subjected to eight hours of ultraviolet light in a humidity chamber at 65° C. followed by a four hour condensation cycle with cooling air on one side of the panel and humidity on the coated side at 35° C.

Application

The formulations of the present invention may be applied to substrates to be protected by conventional techniques, such as spraying, brushing, roller-coating, dipping, flow-coating, and electrostatic airless spraying. The coating formulations may be applied to a variety of substrates, including but not limited to metal and wood.

EXAMPLE I

To the blending kettle, the following components are added tat low speed agitation and in this order:
5.33 gallons of water;
1.30 gallons of dimethyl ethanol amine,
2.06 gallons of ethylene glycol,
0.75 gallons of Nalco 2321 antifoaming agent;
0.1 gallon or 12.8 oz. of Igepal CO-630.,
0.35 gallon or 3.5 lbs. of Tamol 850;
19.2 gallons of butyl cellosolve; and
5.8 gallons of dibutyl phthalate.

22.33 gallons of the acrylic latex was added to the kettle very slowly with low speed agitation. The resulting solution swelled and thickened. Then, 2.86 gallons of strontium chromate and 4.26 gallons of calcium carbonate were added slowly to allow the dry solids to become wetted. When smooth, 3.83 gallons of the carbon black pigment was added, and the grinding speed increased to high. The grinding continued until a temperature of 49°-50° C. was reached and a 6 to 7 grind. In a separate container, 42.30 gallons of acrylic latex was combined with 0.79 gallon of Nalco 2315 antifoaming agent. In another separate container, 0.44 gallon of Raybo 60 corrosion inhibitor was combined with 6.20 gallons of water.

The speed of the mixer in the kettle was reduced to low and the separate latex mixture and the separate water were added alternately so as to maintain an even viscosity. Blending was continued until a uniform mixture was achieved.

The composition was checked for quality assurance to insure that the pH was in the range of 8.5 to 9.5. The viscosity was adjusted with water to a Brookfield #5 spindle at 20 RPM of 4500 to 5500 cps. This composition has a flashpoint of 100° F. minimum.

Test panels were coated with the above composition at a dry film thickness of 8 to 12 mils. After ten passes through the gravelometer at −10° F., the surface of the coating was marred but not destroyed. The gravelometer test results ranged between 4A to 5A, considered to be well within the good range.

This Example and Examples II through IX are summarized in Table 1 below.

TABLE 1

| | I | II | III | IV | V | VI | VII | VIII | IX |
|---|---|---|---|---|---|---|---|---|---|
| Water | 8.519 | 7.628 | 8.105 | 8.069 | 11.940 | 7.944 | 13.923 | 13.260 | 11.524 |
| Dimethyl Ethanol Amine | 0.949 | .953 | 1.013 | 1.009 | .770 | .993 | .944 | .899 | .743 |
| Ethylene Glycol | 1.898 | 1.907 | 2.026 | 2.017 | 1.540 | 1.986 | 1.889 | 1.799 | 1.437 |
| Nalco 2321 | 0.569 | .572 | .608 | .605 | 1.156 | .596 | .567 | .540 | 1.115 |
| Igepal CO-630 | 0.079 | | | .084 | 0.123 | .082 | .078 | .074 | |
| Dibutyl Phthalate | 4.988 | | | | *see below | | *see below | 4.762 | |
| Tamal 850 | 0.344 | | | .365 | .539 | .359 | .342 | .328 | |
| Butyl Cellosolve | 1.898 | 1.907 | 2.026 | 2.017 | 1.156 | 1.986 | 1.889 | 1.799 | 1.115 |
| UCAR 163 | 56.938 | 57.214 | 60.790 | 60.517 | 46.526 | *59.582 | 56.663 | 53.965 | 44.610 |
| Strontium Chromate | 9.490 | 9.536 | 10.132 | 10.086 | 7.703 | 9.930 | 9.444 | 8.994 | |
| Calcium Carbonate | 9.490 | 9.536 | 10.132 | 10.086 | 23.110 | 9.930 | 9.444 | 8.994 | 29.740 |
| Pigment | 3.796 | 3.814 | 4.053 | 4.034 | 3.081 | 3.972 | 3.778 | 3.598 | 7.435 |
| Nalco 2315 | 0.569 | .572 | .608 | .605 | .770 | .596 | .567 | 0.540 | .743 |
| Raybo 60 | 0.474 | .477 | .507 | .504 | .385 | .496 | .472 | 0.450 | .372 |
| XL-20 | | 5.882 | | | 1.156 | 1.490 | | | 1.115 |
| Foamaster VF | | | | | .006 | .007 | | | |
| Aerosil TR | | | | | .038 | .050 | | | |
| | preferred formulation | no blisters salt fog 11 days blistered | no flash rusting can be abraded after water soak no blisters overnight salt fog 11 days blistered | no blisters or settling over weekend - tough coating salt fog 4 days slightly rough no blisters | salt fog 4 days blisters Ci65 2666 hrs. slightly faded QUV perfect panels very tough. *salt fog 175 + DBP no blisters | salt fog no blisters after 2 days | *salt fog 194 + DPB no blisters in 14 days | no blisters over weekend salt fog #1 3 days no blisters 10 days blisters no blisters salt fog 12 days good slight rust | good gravelmeter test results |

TABLE 1-continued

| I | II | III | IV | V | VI | VII | VIII | IX |
|---|----|-----|----|----|----|-----|------|-----|
|   |    |     |    | in 3 days and blisters in 10 days | | | | |

DISCUSSION

Underbody coatings are usually soft waxy or asphalt-based coatings. The coating composition of the present application is based on a 100% acrylic latex. The first experimental acrylic coatings prepared for underbody coatings had an acid pH and were unstable in the neutralized form. However, they were very flexible and abrasion resistant. All of the present formulations are 100% acrylic latex resin based and provide stable, tough, corrosion and abrasion resistant coatings.

MODIFICATIONS

It will be understood by those skilled in the art that the invention is not to be restricted by the examples which merely illustrate the invention, and that the invention is susceptible to a wide variety of modifications and variations without departing from the spirit thereof.

Specific compositions, methods, or embodiments discussed are intended to be only illustrative of the invention disclosed by this Specification. Variations on these compositions, methods, or embodiments are readily apparent to a person of skill in the art based upon the teachings of this Specification, and are therefore intended to be included as part of the inventions disclosed herein. Techniques are described in U.S. Pat. Nos. 4,444,803; 4,479,981 and 4,444,802.

Reference to documents made in the Specification is intended to result in such documents being expressly incorporated herein by reference, including any patents or other literature references cited within such documents.

I claim:

1. A water-borne, anticorrosive, antiabrasive, storage stable and rapidly drying coating composition capable of application and flow on a solid substrate, comprising:
   (a) about 0.5 to 10% by weight of an alkylalkoxy amine, said amine being present in sufficient amount so that the coating composition has a pH within the range of 8.5 to 9.5;
   (b) about 1 to 5% coalescing agent;
   (c) about 30 to 70% of acrylic latex.

2. A composition according to claim 1, wherein the coalescing agent comprises at least one of ethylene glycol and butyl cellosolve, and the composition additionally comprises pigment comprising carbon black, corrosion inhibitor comprising strontium chromate and filler comprising calcium carbonate.

3. A composition according to claim 1 wherein the composition additionally comprises an antifoaming agent comprising at least one of silica and a silicone and a cross linking agent comprising a carbodiimide.

4. A composition according to claim 1, wherein the composition additionally comprises a surfactant comprising nonylphenoxypoly(ethyleneox)ethanol and a sodium salt of a synthetic polyacid.

5. A composition according to claim 4, wherein the composition additionally comprises dibutyl phthalate.

6. An anticorrosive, antiabrasive, storage stable, and rapidly drying coating composition according to claim 1, comprising:
   (a) about 7.9–13.3% by weight of water;
   (b) about 0.9–1.0% of alkyl alkoxy amine;
   (c) about 3.6–4.0% coalescing agent;
   (d) about 1.1–1.2% of antifoaming agent;
   (e) about 0–5.4% of surfactant;
   (f) about 3.6–4.0% of pigment;
   (g) about 9.4–10.6% of corrosion inhibitor;
   (h) about 3.6–4.0% of filler;
   (i) about 0–1.5% of a cross linking agent; and
   (j) about 54.0–60.8% of acrylic latex.

7. A composition according to claim 6, wherein the coalescing agent is selected from the group consisting of ethylene glycol and butyl cellosolve, the pigment comprises carbon black, the corrosion inhibitor is strontium chromate; and the filler is calcium carbonate.

8. An anticorrosive, antiabrasive, storage stable, and rapidly drying coating composition according to claim 1, comprising:
   (a) about 8.1 to 13.3% by weight of water;
   (b) about 0.9 to 1.0% of dimethyl ethanol amine;
   (c) about 3.6 to 4.0% coupling agent;
   (d) about 1.1 to 1.2% of antifoaming agent;
   (e) about 0 to 0.4% of surfactant;
   (f) about 3.6 to 4.0% of pigment;
   (g) about 9.4 to 10.6% of corrosion inhibitor;
   (h) about 9.0 to 10.1% of filler;
   (i) about 54.0 to 60.5% of acrylic latex.

9. A composition according to claim 8 wherein the antifoaming agent comprising at least one of silica and a silicone and the cross linking agent is a carbodiimide.

10. A composition according to claim 8, wherein the composition comprises at least one surfactant selected from the group consisting of nonylphenyloxypoly(ethyleneox)ethanol, dibutylphthalate and a sodium salt of a synthetic polyacid.

11. An anticorrosive, antiabrasive, storage stable, rapidly drying coating composition, according to claim 1, comprising:
   (a) about 8.5% of water;
   (b) about 0.9% of dimethyl ethanol amine;
   (c) about 1.9% of ethylene glycol;
   (d) about 0.6% of a first antifoaming agent;
   (e) about 5.4% of surfactant;
   (f) about 5% of dibutylphthalate;
   (g) about 1.9% of cellosolve;
   (h) about 56.9% of 100% acrylic latex;
   (i) about 9.5% strontium chromate;
   (j) about 9.5% calcium carbonate;
   (k) about 3.8% of a composition comprising about 40% carbon black;
   (l) about 0.6% of a second antifoaming agent; and
   (m) about 0.5% of an alkylamine-based flow additive.

12. An anticorrosive, antiabrasive, storage stable, rapidly-drying coating composition, according to claim 1, comprising:
   (a) about 11.5% of water;
   (b) about 0.7% of dimethyl ethanol amine;
   (c) about 1.5% of ethylene glycol;
   (d) about 1.1% of a first antifoaming agent;
   (e) about 44.61% of acrylic latex;
   (f) about 1.1% of butyl cellosolve;

(g) about 1.1% of cross-linking agent;
(h) about 29.7 of calcium carbonate;
(i) about 7.4% of anticorrosive white pigment;
(j) about 0.7% of a second antifoaming agent, and
(k) about 0.4% of an alkylamine-based flow additive.

13. A water-borne anticorrosive, antiabrasive, storage stable, and rapidly drying coating composition capable of application and flow on a solid substrate, comprising:
   (a) about 5 to 20% by weight of water;
   (b) about 0.5 to 5% of alkyl alkoxy amine;, said amine being present in sufficient amount so that the coating composition has a pH within the range of 8.5 to 9.5;
   (c) about 1 to 5% coalescing agent;
   (d) about 0 to 5% of antifoaming agent;
   (e) about 0 to 10% of surfactant;
   (f) about 0 to 10% of pigment;
   (g) about 0 to 15% of corrosion inhibitor;
   (h) about 35% of filler;
   (i) about 0 to 10% of a cross linking agent; and
   (j) about 40 to 65% of acrylic latex.

14. A composition according to claim 13, wherein the coalescing agent comprises at least one of ethylene glycol and butyl cellosolve, the pigment comprises carbon black, the corrosion inhibitor is strontium chromate; and the filler is calcium carbonate.

15. A composition according to claim 13, wherein the antifoaming agent comprises at least one of silica and a silicone and the cross linking agent is a carbodiimide.

16. A composition according to claim 13, wherein the surfactant comprises nonylphenoxypoly(ethyleneox)ethanol and a sodium salt of a synthetic polyacid.

17. A composition according to claim 13, wherein the composition additionally comprises a surfactant further comprising dibutyl phthalate.

18. A method of producing an anticorrosive, antiabrasive, storage stable, rapidly drying coating composition capable of application and flow on a solid substrate comprising the following steps:
   (a) mixing in a mixing kettle in an essentially fluid state with low speed agitation the following components is substantially the order in which they are given:
      water;
      dimethyl ethanol amine, said amine being present in sufficient amount so that the coating composition has a pH within the range of 8.5 to 9.5;
      ethylene glycol;
      a silica antifoaming agent;
      nonylphenoxypoly(ethyleneox)ethanol, a sodium salt of a synthetic polyacid; butyl cellosolve; dibutylphthalate;
   (b) adding acrylic latex very slowly with agitation;
   (c) adding strontium chromate and calcium carbonate slowly with mixing until smooth;
   (d) adding carbon black and mixing at high speed;
   (e) grinding to a temperature of 49°–50° C. and a 6–7 grind;
   (f) combining acrylic latex with a second antifoaming agent in a first separate container;
   (g) combining an alkylamine-based flow additive with water in a second separate container;
   (h) slowly adding (f) and (g) to the mixing kettle at a slow speed while maintaining an even viscosity; and
   (i) blending until the composition has a uniform consistency to produce said coating composition having a pH of about 8.5 to 9.5.

19. A method according to claim 18 wherein 60% by weight of the total amount of water used is combined with the flow additive at step (g) and about 42% of the acrylic latex is combined at step (f).

20. A method for coating solid substrates, wherein said composition of claim 1 is applied to metal or wood.

21. A method for coating solid substrates as in claim 20 wherein said substrate is metal.

22. A method for coating solid substrates as in claim 20 wherein said substrate is an underbody of a motor vehicle.

23. A motor vehicle, the underbody of which carries a coating applied by the method of claim 22.

24. A method for coating solid substrates, wherein said composition of claim 1 is applied by dipping.

25. A method for coating solid substrates, wherein said composition of claim 1 is applied by brushing.

26. A method for coating solid substrates, wherein said composition of claim 1 is applied by rolling.

27. A method for coating solid substrates, wherein said composition of claim 1 is applied by electrostatic spraying.

28. A method for coating solid substrates, wherein said composition of claim 1 is applied by hand spraying.

* * * * *